(12) United States Patent
Choi

(10) Patent No.: US 11,341,215 B2
(45) Date of Patent: May 24, 2022

(54) DISPLAY DEVICE FOR EXECUTING APPLICATION PROGRAM CAPABLE OF SETTING CODE AND METHOD FOR CONTROLLING DISPLAY DEVICE

(71) Applicant: SAMSUNG ELECTRONICS CO., LTD., Suwon-si (KR)

(72) Inventor: Junsik Choi, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 29 days.

(21) Appl. No.: 16/961,054

(22) PCT Filed: Jan. 16, 2019

(86) PCT No.: PCT/KR2019/000657
§ 371 (c)(1),
(2) Date: Jul. 9, 2020

(87) PCT Pub. No.: WO2019/146954
PCT Pub. Date: Aug. 1, 2019

(65) Prior Publication Data
US 2020/0372130 A1 Nov. 26, 2020

(30) Foreign Application Priority Data
Jan. 25, 2018 (KR) .................. 10-2018-0009337

(51) Int. Cl.
*G06F 21/12* (2013.01)
*G06F 21/31* (2013.01)
*G06F 21/84* (2013.01)

(52) U.S. Cl.
CPC ............ *G06F 21/121* (2013.01); *G06F 21/31* (2013.01); *G06F 21/84* (2013.01)

(58) Field of Classification Search
CPC ......... H04N 7/16; G06F 21/121; G06F 21/31; G06F 21/84
See application file for complete search history.

(56) References Cited

U.S. PATENT DOCUMENTS

| | | | |
|---|---|---|---|
| 9,720,700 B1* | 8/2017 | Brown | G06F 13/4068 |
| 9,984,246 B2* | 5/2018 | Yan | G06F 21/31 |
| 10,083,559 B2* | 9/2018 | Schoenfelder | G06F 21/34 |
| 10,372,921 B2* | 8/2019 | Deras Arreola | H04W 12/37 |
| 10,402,301 B2* | 9/2019 | Qadri | G06F 11/3608 |
| 10,521,571 B2* | 12/2019 | Brown | G06F 21/78 |
| 11,132,425 B1* | 9/2021 | Cohen | H04L 63/107 |
| 2012/0124615 A1* | 5/2012 | Lee | H04N 21/482 725/30 |
| 2014/0359601 A1* | 12/2014 | Constable | G06F 8/61 717/175 |
| 2015/0195594 A1* | 7/2015 | Hicks | H04N 21/47202 725/25 |
| 2016/0253510 A1* | 9/2016 | Lim | H04L 63/083 726/30 |
| 2017/0286046 A1* | 10/2017 | Pardi | G06F 3/0482 |

* cited by examiner

*Primary Examiner* — Viral S Lakhia
(74) *Attorney, Agent, or Firm* — Staas & Halsey LLP

(57) ABSTRACT

According to an embodiment disclosed in this specification, a display device may include an input interface, a display, a memory for storing a plurality of applications, and a processor operatively connected to the input interface, the display, and the memory. The plurality of applications may include a first application, and a first code may be set for the first application with respect to at least a first user identification (ID).

18 Claims, 9 Drawing Sheets

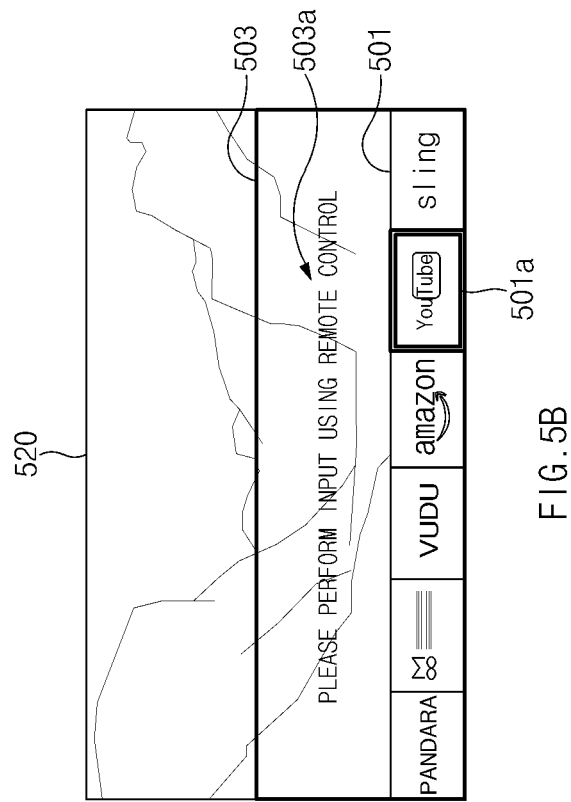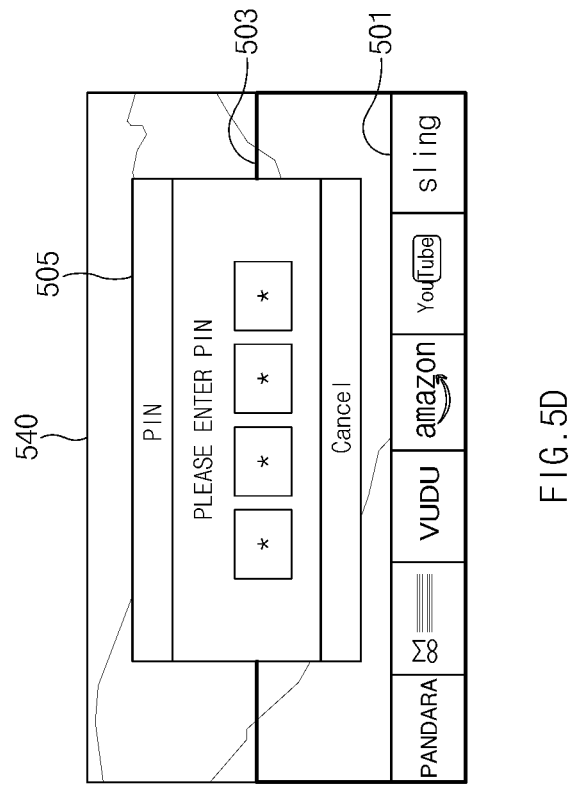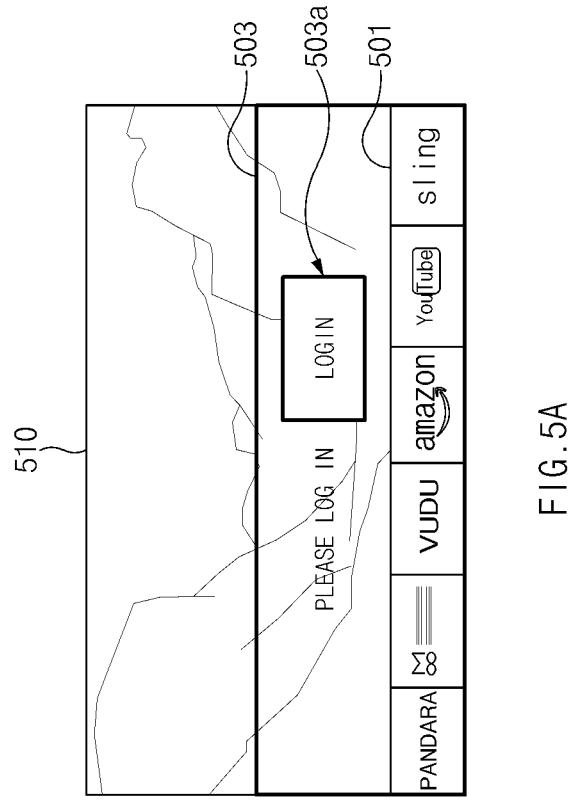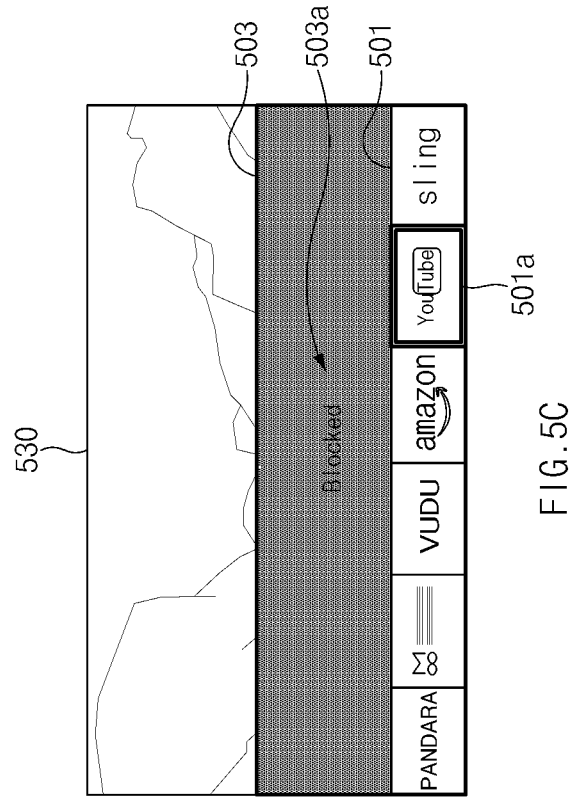

DISPLAY DEVICE FOR EXECUTING APPLICATION PROGRAM CAPABLE OF SETTING CODE AND METHOD FOR CONTROLLING DISPLAY DEVICE

CROSS-REFERENCE TO RELATED APPLICATIONS

This application is a U.S. National Stage Application which claims the benefit under 35 U.S.C. § 371 of International Patent Application No. PCT/KR2019/000657 filed on Jan. 16, 2019, which claims foreign priority benefit under 35 U.S.C. § 119 of Korean Patent Application No. 10-2018-0009337 filed on Jan. 25, 2018 in the Korean Intellectual Property Office, the contents of both of which are incorporated herein by reference.

TECHNICAL FIELD

Embodiments disclosed in this specification relate to a technology of executing an application to perform a specified operation.

BACKGROUND ART

A display device refers to a device that outputs content received from the outside or content stored therein. Nowadays, the display device may not only provide content to a user unilaterally but also execute an application program that performs a specified operation to provide a service to the user.

Furthermore, the display device may be connected to an external server to provide a cloud service that uploads the obtained information and receives the stored information. Accordingly, the user may receive various services through the display device.

DISCLOSURE

Technical Problem

When anyone log in with a specified user identification (ID), a display device may provide settings and information corresponding to the logged-in user ID regardless of a user employing the display device. When the display device is a public device, a plurality of users may employ the display device, to which a user logs in with a specified ID. Accordingly, even though a code is registered in the user ID registered in the display device, the privacy of a user may not be protected. In particular, when the display device is a public device, the display device may be very vulnerable to the protection of personal information (e.g., a photo, or the like) capable of being provided depending on the registered user ID.

The display device according to various embodiments of the disclosure may provide a method for protecting a user's privacy by setting a code for each app installed depending on the registered user ID.

Technical Solution

According to an embodiment disclosed in this specification, a display device may include an input interface, a display, a memory for storing a plurality of applications, and a processor operatively connected to the input interface, the display, and the memory. The plurality of applications may include a first application, and a first code may be set for the first application with respect to at least a first user identification (ID). The processor may be configured, in a state of logging in with the first user ID, to receive a first user input for executing a first application through the input interface, to display a UI for receiving a second user input on the display, to receive a second user input through the input interface, to provide the first content when the second user input corresponds to the first code, in a state of logging in with the second user ID, to provide the second content in response to receiving the first user input.

Furthermore, according to an embodiment disclosed in this specification, a control method of a display device may include in a state of logging in with the first user ID, receiving a first user input for executing a first application, displaying a UI for receiving a user input in a display, receiving a second user input, and providing the first content when the second user input corresponds to the first code, in a state of logging in with the second user ID, providing the second content in response to receiving the first user input.

Moreover, according to an embodiment disclosed in this specification, a computer-readable recording medium may record a program for performing a method including, in a state of logging in with a first user ID, receiving a first user input for executing a first application, displaying a UI for receiving a user input in a display, receiving a second user input, and providing the first content when the second user input corresponds to the first code, in a state of logging in with a second user ID, providing the second content in response to receiving the first user input.

Advantageous Effects

According to embodiments disclosed in the specification, a display device may set code information for determining whether to provide the stored application program with specified information depending on the logged-in user ID, thereby preventing leakage of privacy information of a user capable of being generated in a public device. Moreover, the display device may provide user convenience by differently setting the application for which the code is set for each registered user.

Besides, a variety of effects directly or indirectly understood through the disclosure may be provided.

DESCRIPTION OF DRAWINGS

FIGS. 5A, 5B, 5C and 5D are screens in which a display device executes the operation of FIG. 4, according to an embodiment.

With regard to description of drawings, the same or similar components may be marked by the same or similar reference numerals.

MODE FOR INVENTION

Hereinafter, various embodiments of the disclosure will be described with reference to accompanying drawings. Accordingly, those of ordinary skill in the art will recognize that modification, equivalent, and/or alternative on the various embodiments described herein can be variously made without departing from the scope and spirit of the disclosure. With regard to description of drawings, similar components may be marked by similar reference marks/numerals.

Figure 1:
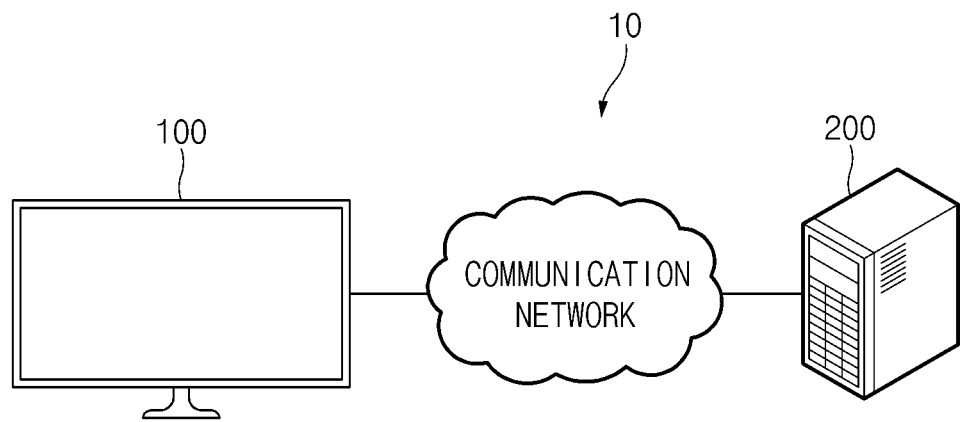
FIG. 1 is a view illustrating the configuration of a content providing system according to an embodiment.

FIG. 1 is a view illustrating the configuration of a content providing system according to an embodiment.

Referring to FIG. 1, a content providing system 10 may include a display device 100 and an external server 200.

According to an embodiment, the display device 100 may output content. For example, the display device 100 may output the content received from an external device (e.g., the external server 200). For another example, the display device 100 may output the content stored in a memory. According to an embodiment, the display device 100 may output the content through an output interface. For example, the display device 100 may display an image included in the content on a display and may output the sound included in the content through a speaker.

According to an embodiment, the display device 100 may provide a specified service to a user by executing an application program (or an app) stored in the memory. For example, the display device 100 may provide a user with a function of outputting an image (e.g., a video image), a cloud function, a file search function, and the like through a plurality of apps stored in the memory. For example, the cloud function may be provided through the external server 200.

According to an embodiment, the display device 100 may provide a cloud service through the external server (e.g., a cloud server) 200. For example, the display device 100 may upload the content provided through an app, onto the external server 200. Further, the display device 400 may receive the uploaded content from the external server 200 and may provide a user with the received content.

According to an embodiment, the display device 100 may be implemented with various devices capable of outputting the content to as a TV, a desktop, a notebook PC, a smartphone, a tablet PC, a monitor, an electronic picture frame or the like and executing an application to provide a specified service.

According to an embodiment, at least one user ID may be registered in the display device 100. The user may register a user ID in the display device 100 to employ the display device 100. The user may log in with the registered user ID to employ the display device 100. According to an embodiment, the display device 100 may provide different setting states or information depending on the logged-in user ID. For example, the display device 100 may execute the same application (e.g., a gallery app) and may provide information (e.g., a photo) different depending on the logged-in user ID.

According to an embodiment, the display device 100 may store information about the registered user ID in the memory. For example, the information about the registered user ID may include at least one of identification information for distinguishing registered users, setting information of the display device 100, and the provided content information. Accordingly, the same display device 100 may provide different services to a plurality of users.

According to an embodiment, a code (e.g., a password) for logging in may be set for the user ID registered in the display device 100. To log in with a specific user ID, the user may log in after a specified code is first entered. Accordingly, the display device 100 may protect the privacy of the user by installing the specified code in the registered user ID.

When anyone logs in with a specified user ID, the display device 100 may provide settings and information corresponding to the logged-in user ID regardless of a user who employs the display device 100. When the display device 100 is a public device (e.g., TV), a plurality of users may employ the display device 100 to which a user logs in with a specified ID. Accordingly, even though a code is registered in the user ID registered in the display device 100, the privacy of a user may not be protected. In particular, when the display device 100 is a public device, the display device may be very vulnerable to the protection of personal information (e.g., a photo, or the like) capable of being provided depending on the registered user ID. The display device 100 according to various embodiments of the disclosure may protect a user's privacy by setting a code for each installed app.

Figure 2:
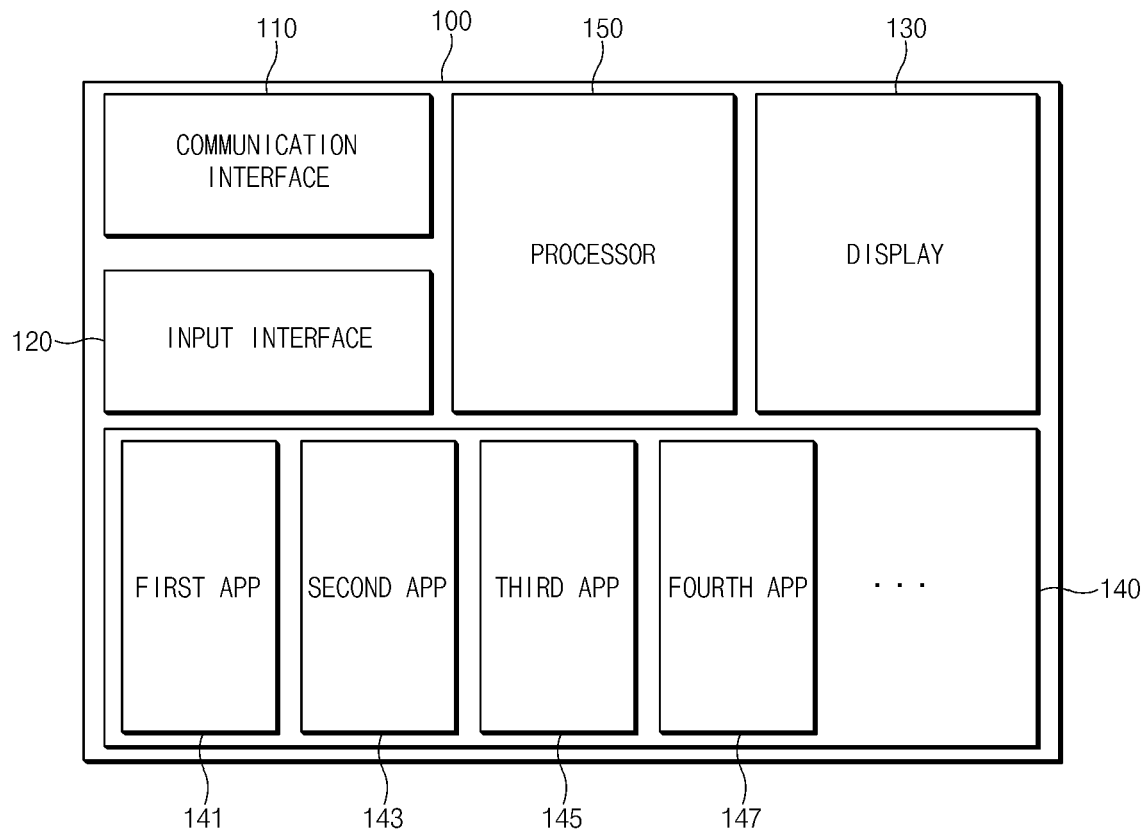
FIG. 2 is a block diagram illustrating a configuration of a display device according to various embodiments.

FIG. 2 is a block diagram illustrating a configuration of a display device according to various embodiments.

Referring to FIG. 2, the display device 100 may include a communication interface 110, an input interface 120, a display 130, a memory 140, and a processor 150.

According to an embodiment, the communication interface 110 may communicate with an external device (e.g., the external server 200 of FIG. 1). For example, the communication interface 110 may be connected to an external device to receive content. For another example, the communication interface 110 may be connected to an external device to transmit or receive data for providing a cloud service.

According to an embodiment, the input interface 120 may receive a user input. For example, the input interface 120 may receive a user's touch input (or a touch using an electronic pen) through a touch panel combined with the display 130.

According to an embodiment, the display 130 may display an image. For example, the first display may display a user interface (UI) (e.g., a graphical user interface (GUI)) of the executed app.

According to an embodiment, the memory 140 may store a plurality of apps that execute specified functions. For example, the memory 140 may store a first app 141 (e.g., an app for providing the stored image), a second app 143 (e.g., an app for providing the stored video image), a third app 145 (e.g., an app for providing a cloud service), and a fourth app 147 (e.g., an app for managing a file). According to an embodiment, the specified code for the user ID may be set for at least one app among a plurality of apps stored in the memory 140. For example, the specified code may be set to provide content through the at least one app.

According to an embodiment, the processor 150 may be operatively connected to the communication interface 110, the input interface 120, the display 130, and the memory 140 may control the overall operation of the display device 100.

According to an embodiment, the processor 150 may set the code for providing the specified information in at least one app among a plurality of apps stored in the memory 140. For example, the processor 150 may set a code in at least one app selected by the user. For example, the code may include personal identification number (PIN) information.

According to an embodiment, the processor 150 may set codes different for each user ID. For example, the processor 150 may set a first code for the first user ID. Also, the processor 150 may set a second code for the second user ID. According to an embodiment, the processor 150 may set codes in apps different for each user ID. For example, the processor 150 may set the first code in the second app 143 and the third app 145 among the plurality of apps stored in the memory 140 with respect to the first user ID. The processor 150 may not set a code for one of a plurality of apps with respect to the second user ID.

According to an embodiment, the processor 150 may provide specified information by executing an app in which a code is set for the first user ID. For example, when the processor 150 executes the app, in which a code is set, in a state where a user logs in with the first user ID, the processor 150 may perform an operation as follows.

According to an embodiment, the processor 150 may receive a first user input for executing an app through the input interface 120. For example, the processor 150 may receive a first user input for executing the first app (e.g., a gallery app) 141 stored in the memory 140. The code necessary to provide information corresponding to a logged-in user ID may be set for the first application.

According to an embodiment, the processor 150 may display a UI for receiving the second user input on the display 130. For example, the processor 150 may display a UI for receiving the code set for the first app 141 on the display 130.

According to an embodiment, the processor 150 may receive a second user input through the input interface 120. For example, the second user input may be a code input for receiving specified information (e.g., an image) through the first app 141.

According to an embodiment, when the received second user input corresponds to the first code set for the executed app, the processor 150 may provide specified information through the executed app. For example, when the second user input corresponds to the first code, the processor 150 may output the first content (e.g., an image) through the display 130. For example, the first content may be provided based on the first user ID.

According to an embodiment, the processor 150 may provide specified information by executing an app for a code is set. For example, when executing an app for which code is set, the processor 150 may perform an operation as follows.

According to an embodiment, the processor 150 may provide the specified information by executing an app for which code is not set with respect to the second user ID. For example, when the processor 150 executes the app, in which a code is not set, in a state where a user logs in with the second user ID, the processor 150 may perform an operation as follows.

According to an embodiment, the processor 150 may receive a first user input for executing an app through the input interface 120. According to an embodiment, the processor 150 may provide the second content (e.g., an image) in response to the first user input. For example, the second content may be provided based on the second user ID. The second content may be different from the first content provided when a user logs in with the first user ID.

Figure 3:
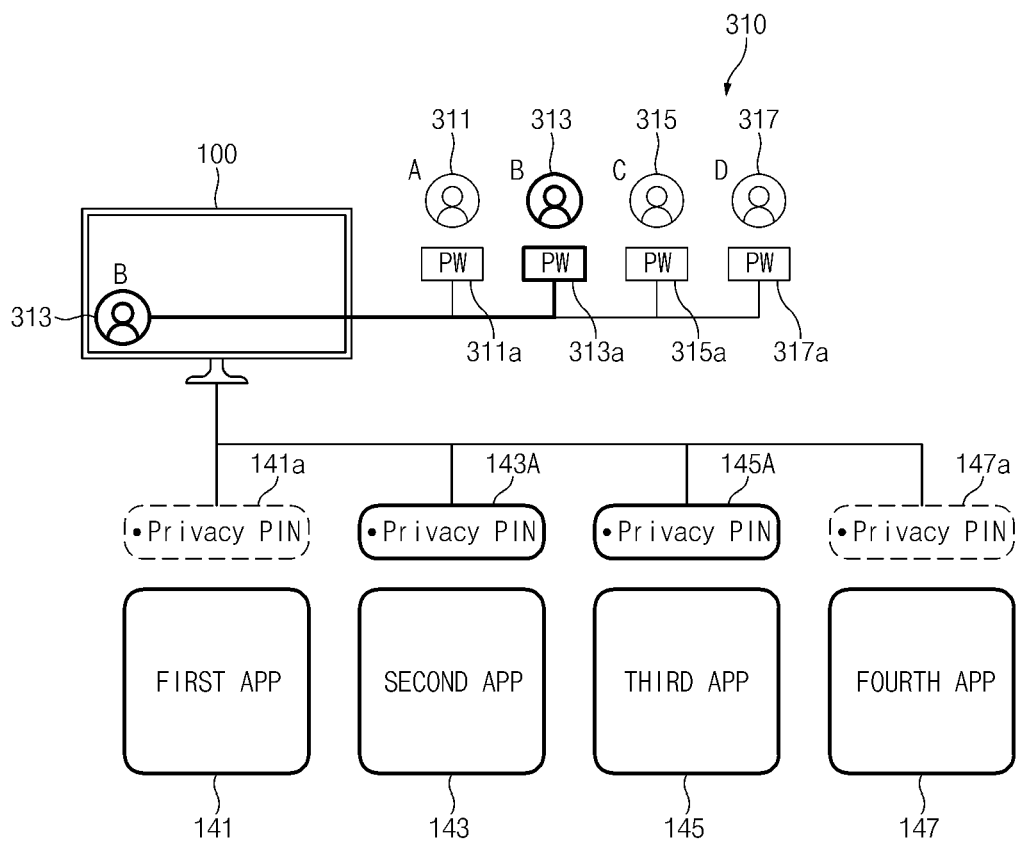
FIG. 3 is a conceptual diagram illustrating that a code is set depending on a user ID registered in a display device according to various embodiments.

FIG. 3 is a conceptual diagram illustrating that a code is set depending on a user ID registered in a display device according to various embodiments.

Referring to FIG. 3, the display device 100 may execute an app, in which a code is set depending on the logged-in user ID.

According to an embodiment, a plurality of user IDs may be registered in the display device 100. For example, the first user ID 311, the second user ID 313, the third user ID 315, and the fourth user ID 317 may be registered in the display device 100. According to an embodiment, the display device 100 may store information about a plurality of registered user IDs. For example, the display device 100 may store pieces of code information 311*a*, 313*a*, 315*a*, and 317*a* corresponding to the plurality of user IDs, respectively.

According to an embodiment, a user may log in with a second user ID 313 among the plurality of registered user Ids to the display device 100. According to an embodiment, the display device 100 may execute at least one of the plurality of apps 141, 143, 145, and 147 based on the logged-in second user ID 313 and may provide specified information through the executed at least one app. According to an embodiment, a code may be set for at least one of the plurality of apps 141, 143, 145, and 147 with respect to the second user ID 313. For example, the second app 143 and the third app 145 may be in a state 143*a* or 145*a* where a code is set for the second user ID 313. The first app 141 and the fourth app 147 may be in a state 141*a* or 147*a* where a code is not set for the second user ID 313.

According to an embodiment, when receiving the first user input for executing an app in which a code is set, the display device 100 may display a UI for inputting a code on a display (e.g., the display 130 in FIG. 2) and may receive the second user input for inputting the code. According to an embodiment, when the received second user input corresponds to the set code, the display device 100 may provide specified information through the executed app.

Figure 4:
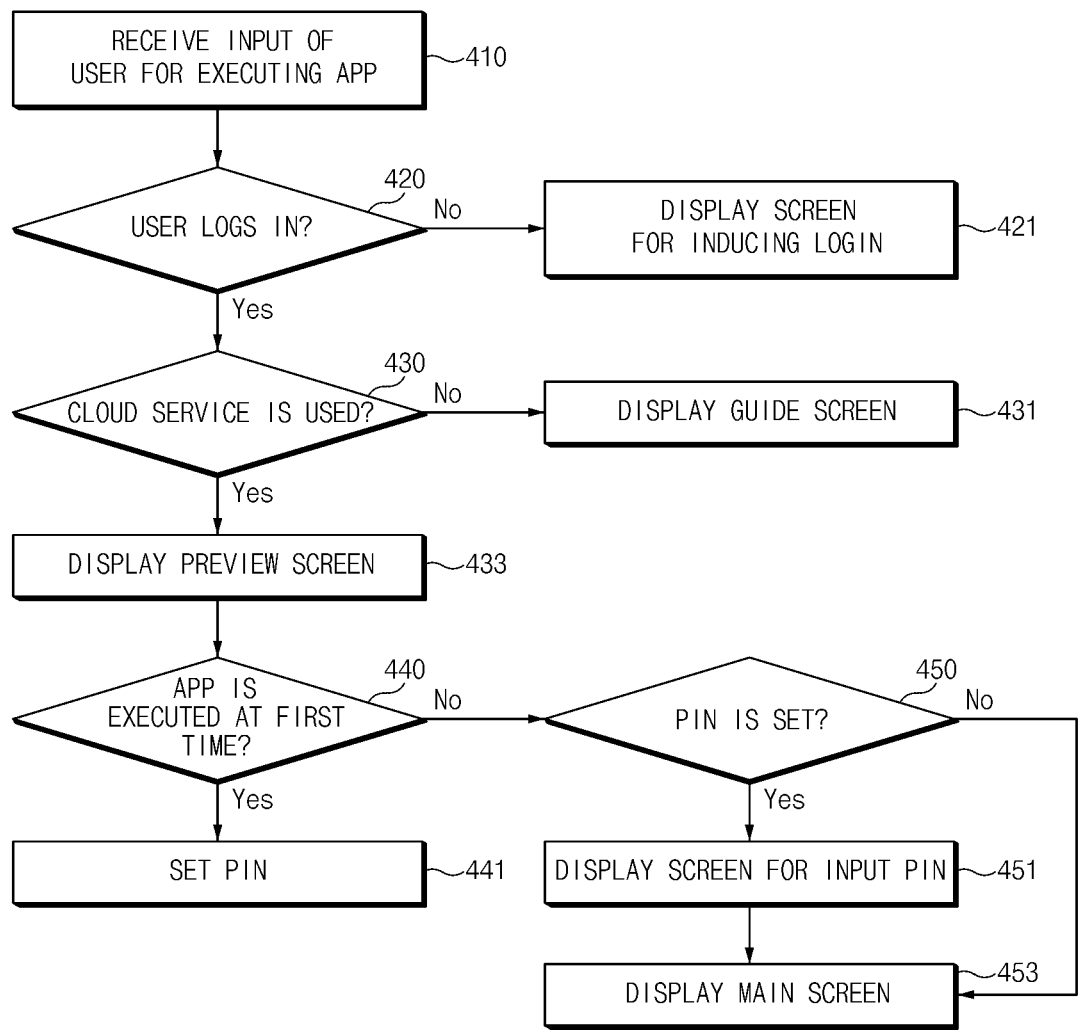
FIG. 4 is a flowchart illustrating a method in which a display device executes an app, according to various embodiments.

FIG. 4 is a flowchart illustrating a method in which a display device executes an app, according to various embodiments.

Referring to FIG. 4, the display device 100 may execute one of a plurality of apps in a state where a user logs in with a single user ID among at least one registered user ID.

According to an embodiment, in operation 410, the display device 100 may receive a first user input for executing an app of a plurality of apps.

In operation 420, the display device 100 may determine whether a user logs in with a user ID. According to an embodiment, in operation 421, the display device 100 may display a screen for inducing login on the display (e.g., display 120 in FIG. 2) when a user does not log in with the user ID (No).

According to an embodiment, in operation 430, the display device 100 may determine whether a cloud service is used, when the user logs in with the user ID (Yes). According to an embodiment, in operation 431, the display device 100 may display guide information for executing the app corresponding to the first user input on the display when the cloud service is not used (No). According to an embodiment, the display device 100 may execute an app corresponding to the first user input.

According to an embodiment, in operation 433, the display device 100 may display preview information indicating at least part of information received from an external server (e.g., the external server 200 of FIG. 1) on the display when the cloud service is used (Yes). According to an embodiment, when the code is set for the executed app, the display device 100 may not display the preview information on the display. For example, the display device 100 may block the preview information displayed on the display. According to an embodiment, the display device 100 may execute an app corresponding to the first user input.

According to an embodiment, in operation 440, the display device 100 may determine whether an app corresponding to the first user input is first executed. According to an embodiment, in operation 441, the display device 100 may set a code when the app corresponding to the first user input is first executed (Yes).

According to an embodiment, in operation 450, the display device 100 may determine whether the code is set for the executed app, when the app corresponding to the first user input is not in the first execution state (No). According to an embodiment, in operation 451, the display device 100 may display a UI for receiving a code input on the display, when the code is set for the executed app (Yes). According to an embodiment, the display device 100 may receive a second user input for code input through the UI displayed on the display.

According to an embodiment, in operation 453, the display device 100 may display the main screen (e.g., UI) of the executed app on the display, when the code is not set for the executed app (No) or when the second user input corresponds to the code set for the executed app.

FIG. 5 is a screen in which a display device executes the operation of FIG. 4, according to an embodiment.

According to an embodiment, the display device 100 may display a plurality of indicators 501 corresponding to a plurality of apps, which are capable of being executed depending on a user input, on a screen on which a content image is displayed. According to an embodiment, the display device 100 may display specified information in a specified region 503.

Referring to (a), when performing the operation 421 of FIG. 4, the display device 100 may display a screen 510 for inducing login on a display. For example, the display device 100 may display information 503a for the login of a user in the specified region 503.

Referring to (b), when performing the operation 431 of FIG. 4, the display device 100 may display a screen 520 for executing an app on the display. For example, the display device 100 may display guide information 503b for inducing an input for executing the app in the specified region 503.

Referring to (c), when performing the operation 433 of FIG. 4, the display device 100 may display a screen 530 for blocking preview information on the display. For example, the display device 100 may block the preview information displayed in the specified region 503.

Referring to (d), when performing operation 451 of FIG. 4, the display device 100 may display a screen 540 for receiving a code input on the display. For example, the display device 100 may display a UI 505 for receiving a code (or PIN) on the display.

Figure 6A:
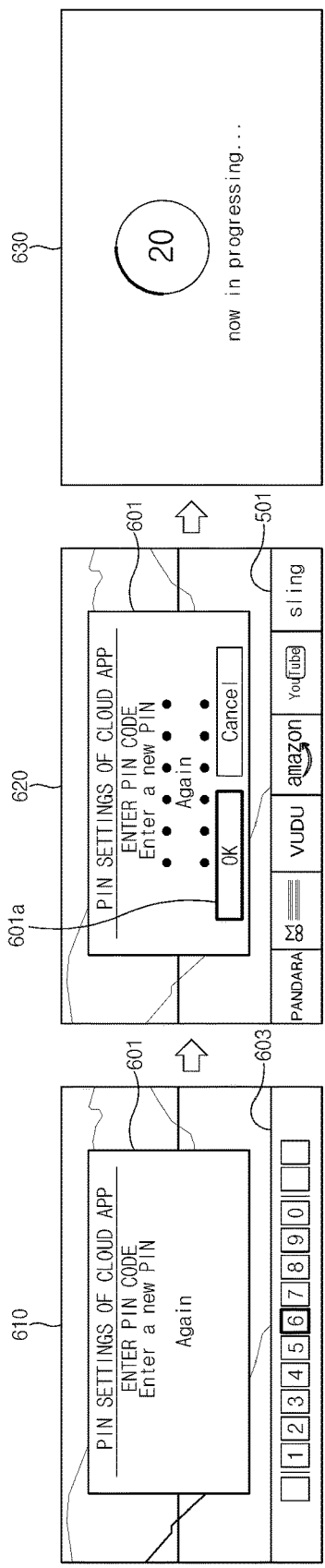
FIGS. 6A and 6B are screens in which a display device sets or cancels a code in an application, according to an embodiment.
Figure 6B:
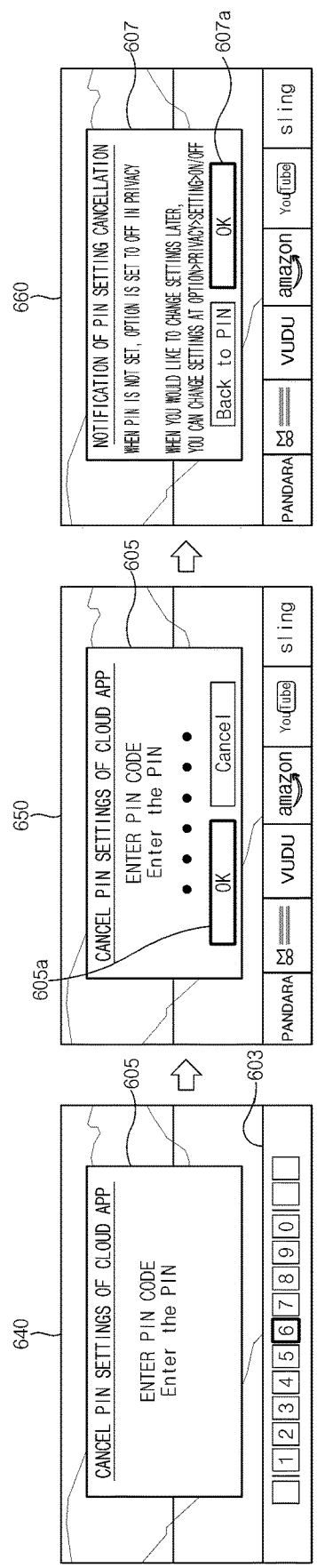

FIG. 6 is a screen in which a display device sets or cancels a code in an application, according to an embodiment.

Referring to FIG. 6, the display device 100 may display a screen for setting a code in an app on a display.

Referring to (a), when performing the operation of operation 441 of FIG. 4, the display device 100 may display screens 610, 620, and 630 for setting a code in the app on the display.

According to an embodiment, the display device 100 may display the screen 610 for receiving a user input to set a code in the app, on the display. For example, the display device 100 may display a UI 601 for setting a code and a UI (e.g., a number pad) 603 for receiving a user input, on the display (e.g., the display in FIG. 2).

According to an embodiment, the display device 100 may display the screen 620 for setting the input code in the app on the display. For example, the display device 100 may receive a user input 601a through the UI 601 for setting a code. According to an embodiment, the display device 100 may display a screen 630 for setting a code in the app, on the display.

Accordingly, the display device 100 may set the code corresponding to a user input in the specified app.

Referring to (b), the display device 100 may display screens 640, 650, and 660 for cancelling the code of the app, in which a code is set, on the display.

According to an embodiment, the display device 100 may display the screen 640 for identifying the input code, on the display. For example, the display device 100 may display a UI 605 for identifying a code and a UI 603 for receiving a user input on the display.

According to an embodiment, the display device 100 may display the screen 605 for identifying whether the user input corresponds to the code set for the app, on the display. For example, the display device 100 may receive a user input 605a through a UI 605 for identifying a code. According to an embodiment, the display device 100 may display a UI 607 for identifying the code cancellation of the app on the display and may receive a user input 607a for identifying code cancellation.

Accordingly, the display device 100 may cancel the code set for the specified app.

Figure 7:
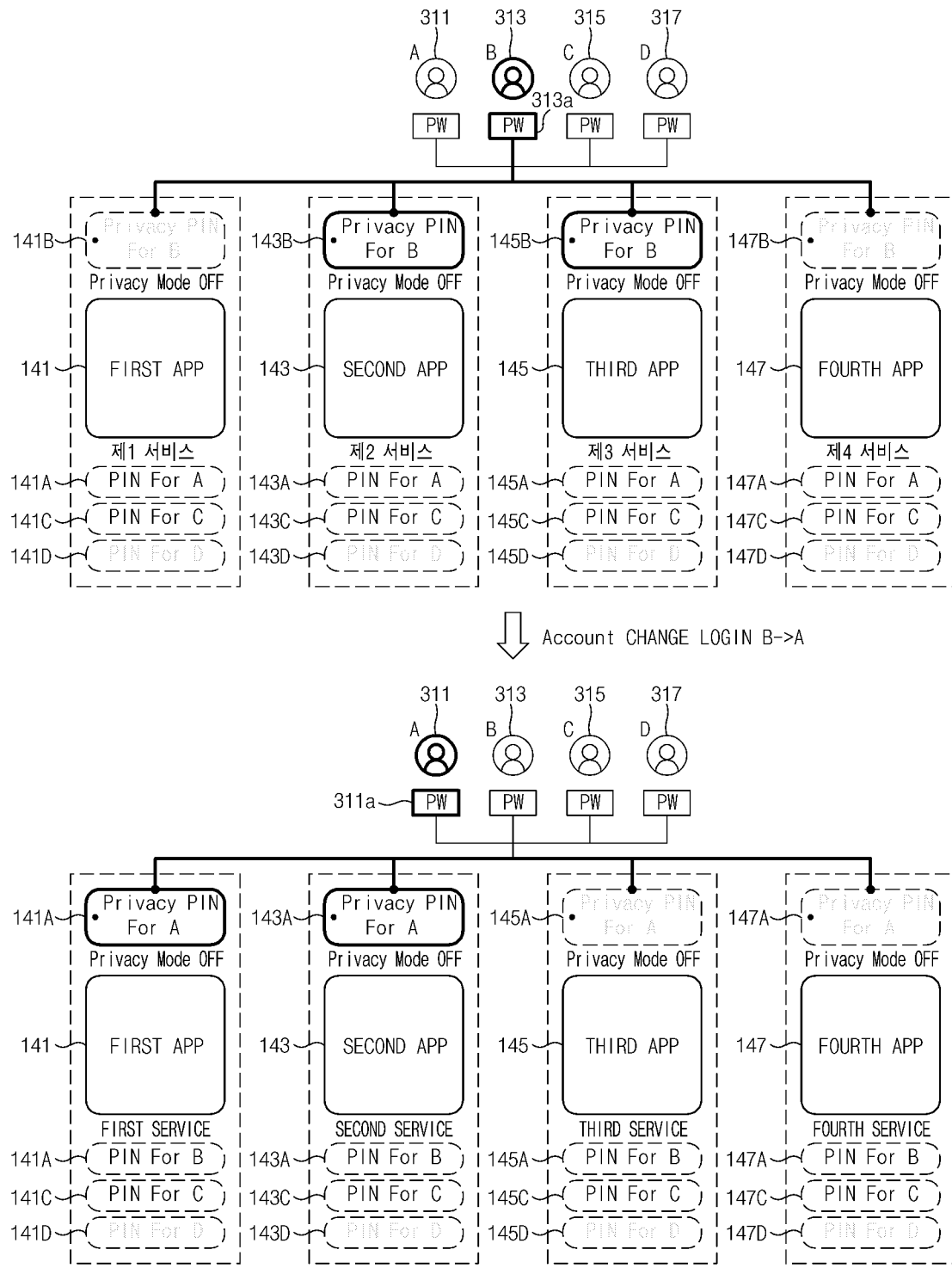
FIG. 7 is a diagram illustrating that a user ID, with which a user logs in to a display device, according to an embodiment.

FIG. 7 is a diagram illustrating that a user ID, with which a user logs in to a display device, according to an embodiment.

Referring to FIG. 7, a user ID with which a user logs in to the display device 100 may be changed from a second user ID 313 to a third user ID 315.

According to an embodiment, a plurality of user IDs 311, 313, 315, and 317 may be registered in the display device 100. According to an embodiment, the display device 100 may store the plurality of apps 141, 143, 145, and 147.

According to an embodiment, the display device 100 may store code setting information of the plurality of user IDs 311, 313, 315, and 317 in the plurality of apps 141, 143, 145, and 147, respectively. For example, the display device 100 may include code setting information 141A, 143A, 145A, and 145A of the first user ID, code setting information 141B, 143B, 145B, and 145B of the second user ID, code setting information 141C, 143C, 145C, and 147C of the third user ID, and code setting information 141D, 143D, 145D, and 147D of the fourth user ID. A code may not be set for the fourth user ID in the plurality of app 141, 143, 145, and 147.

According to an embodiment, the display device 100 may be in a state where a user logs in with a second user ID 313. For example, a password 313a for login may be set for the second user ID 313. According to an embodiment, when receiving the first user input for executing the second app 143 or the third app 145, in which a code is set, the display device 100 may display a UI for inputting a code on the display (e.g., the display 130 in FIG. 2) and may receive the second user input to input the code. According to an embodiment, when the second user input corresponds to the code set for an app, the display device 100 may execute the second app 143 or the third app 145. Besides, when receiving a third user input for executing the first app 141 or the fourth app 147, in which a code is not set, the display device 100 may execute the first app 141 or the fourth app 147 without inputting a code.

According to an embodiment, in the display device 100, the logged-in user ID may be changed to the third user ID 315. For example, a password 315*a* for login may be set for the third user ID 315. According to an embodiment, when receiving the first user input for executing the first app 141 or the second app 143 in which a code is set, the display device 100 may display a UI for inputting a code on the display and may receive the second user input to input the code. According to an embodiment, when the second user input corresponds to the code set for an app, the display device 100 may execute the first app 141 or the second app 143. Besides, when receiving a third user input for executing the third app 145 or the fourth app 147, in which a code is not set, the display device 100 may execute the third app 145 or the fourth app 147 without inputting a code.

Figure 8:
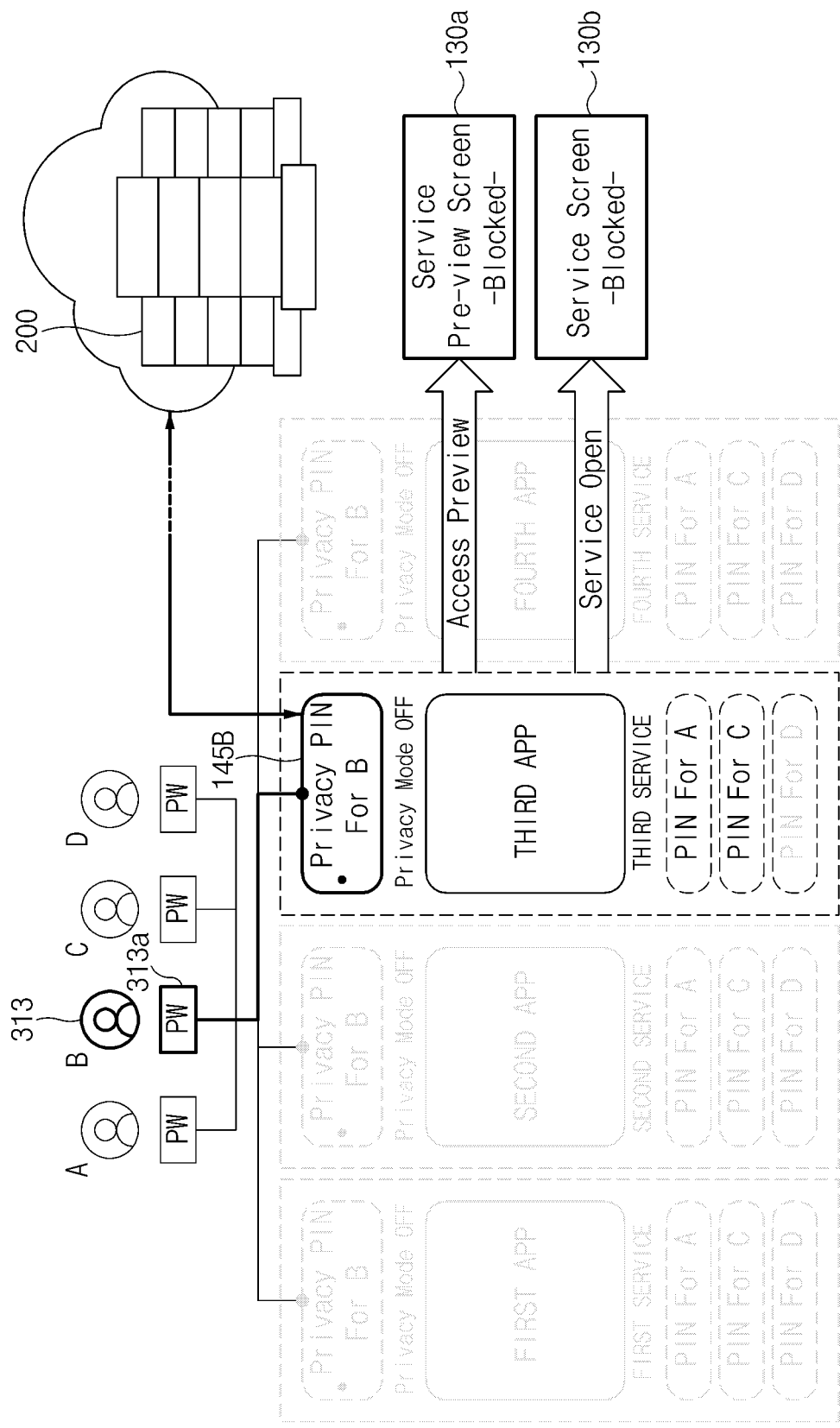
FIG. 8 is a diagram illustrating that a display device provides a cloud service according to an embodiment.

FIG. 8 is a diagram illustrating that a display device provides a cloud service according to an embodiment.

Referring to FIG. 8, a code may be set for the third app 145 for providing a cloud service with respect to the second user ID 313, with which a user logs in to the display device 100. The password 313*a* for login may be set for the second user ID 313.

According to an embodiment, when receiving a first user input for executing the third app 145, the display device 100 may access an external server (e.g., the external server 200 in FIG. 1) to provide specified information. The specified information may include preview information 130*a* and main information 130*b*. According to an embodiment, before the code set for the third app 145 is entered into the display device 100, the access to the specified information may be blocked. According to an embodiment, the display device 100 receives a second user input for inputting a code; the display device 100 may access the specified information in which the second user input corresponds to the code.

According to an embodiment, the display device 100 may upload updated information to an external server regardless of whether a code is set for the third app 145.

Figure 9A:
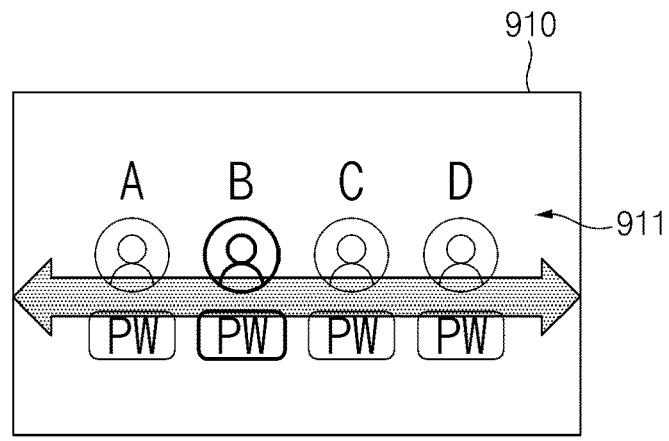
FIGS. 9A, 9B and 9C are screens in which a display device controls a code setting state of an app, according to an embodiment.
Figure 9B:
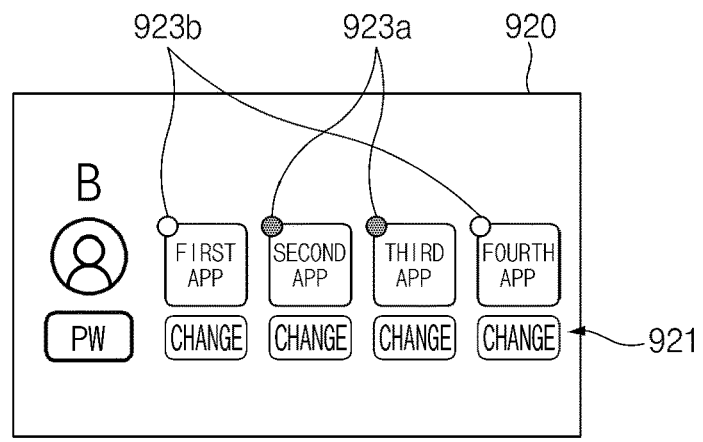
Figure 9C:
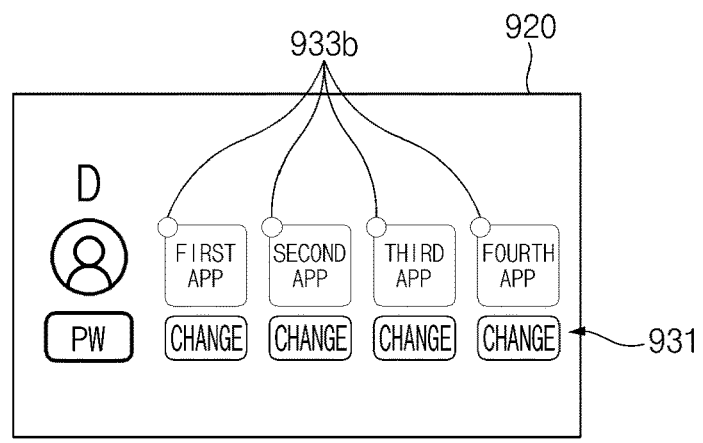

FIG. 9 is a screen in which a display device controls a code setting state of an app, according to an embodiment.

Referring to FIG. 9, the display device 100 may change code setting states of a plurality of user IDs.

Referring to (a), the display device 100 may display a screen 910 for selecting a user ID capable of changing a code setting state on a display. The display device 100 may display a registered user ID 911 on the display. For example, the display device 100 may receive a user input to select a second user to change the code setting state.

Referring to (b), and (c), the display device 100 may display the stored plurality of apps 921 on the display and may display the code setting states 923*a* and 923*b*. For example, the state 923*a* where a code is set for the second app and the third app among the plurality of apps 921 may be indicated with respect to the second user ID. For another example, with respect to a fourth user ID, all of the plurality of apps 921 may indicate the state 923*b* where a code is not set.

According to various embodiments of the disclosure described in FIGS. 1 to 9, the display device 100 may set code information for determining whether to provide specified information according to a user ID, with which a user logs in to the stored app, thereby preventing the leakage of privacy information of a user that may occur in a public device. Moreover, the display device 100 may provide user convenience by differently setting an app in which the code is set for each registered user.

According to various embodiments, at least part of a device (e.g., modules or functions thereof) or a method (e.g., operations) may be, for example, implemented by instructions stored in a computer-readable storage media in the form of a program module. The instruction, when executed by a processor, may cause the processor to perform a function corresponding to the instruction. The computer-readable recording medium may include a hard disk, a floppy disk, a magnetic media (e.g., a magnetic tape), an optical medium (e.g., a compact disc read only memory (CD-ROM) and a digital versatile disc (DVD), a magneto-optical media (e.g., a floptical disk)), an embedded memory, or the like. The one or more instructions may contain a code made by a compiler or a code executable by an interpreter.

While the disclosure has been shown and described with reference to various embodiments thereof, it will be understood by those skilled in the art that various changes in form and details may be made therein without departing from the spirit and scope of the disclosure as defined by the appended claims and their equivalents.

The invention claimed is:

1. A display device, comprising:
   an input interface;
   a display;
   a memory configured to store a plurality of applications and at least a user identification (ID), the plurality of applications including a first application; and
   a processor operatively connected to the input interface, the display, and the memory;
   wherein the processor is configured to:
      in a state of being logged-in with a first user ID for the display device, receive a first user input for executing the first application through the input interface;
      determine a code being set to the first application;
      when the code is a first code with respect to current log-in of the first user ID, display a user interface (UI) for receiving a second user input on the display;
      receive the second user input;
      when the second user input corresponds to the first code, provide a first content of the first application; and
      when the code is a second code with respect to a second user ID, provide a second content of the first application
   wherein the processor blocks the first content displayed on the display before receiving the second user input corresponding to the first code.

2. The display device of claim 1, wherein the processor is further configured to:
   when the code is not set to the first application, provide the second content of the first application.

3. The display device of claim 1, wherein the first content and the second content include preview information of a content provided through the first application.

4. The display device of claim 1, further comprising:
   a communication interface connected with an external device,
   wherein the processor uploads a content provided through the first application onto a cloud server connected to the communication interface and displays preview information, which is included in the first content or the second content, about information uploaded onto the cloud server during a specified period, on the display.

5. The display device of claim 4, wherein the processor uploads a content received regardless of whether the first code of the first application is set, onto the cloud server through the communication interface.

6. The display device of claim 1, wherein the first application includes code setting information about each of the first user ID and the second user ID.

7. The display device of claim 6, wherein the code setting information includes whether a code is set, and information about a code value.

8. The display device of claim 1, wherein, when executing the first application at a first time, the processor receives a third user input as to whether a code is set for the first application executed at the first time, through the input interface and sets the first code in the first application based on the third user input.

9. The display device of claim 8, wherein, when the third user input is an input for setting a PIN code in the application executed at the first time, the processor receives a fourth user input for determining a code through the input interface and sets the first code in the first application depending on the fourth user input.

10. A method of control of a display device, the method comprising:
   in a state of being logged-in with a first user ID, receiving a first user input for executing a first application;
   determining a code being set to the first application;
   when the code is a first code with respect to current log-in of the first user ID, displaying a user interface (UI) for receiving a user input in a display;
   receiving a second user input; and
   providing a first content of the first application when the second user input corresponds to the first code; and
   when the code is a second code with respect to a second user ID, providing a second content of the first application,
   the method further comprising:
      blocking the first content displayed on the display before receiving the second user input corresponding to the first code.

11. The method of claim 10, further comprising:
   when the code is not set to the first application, providing the second content of the first application.

12. The method of claim 10, wherein the first content and the second content include preview information of a content provided through the first application.

13. The method of claim 10, further comprising:
   uploading a content provided through the first application onto a cloud server connected to the display device, and
   displaying preview information, which is included in the first content or the second content, about information uploaded onto the cloud server during a specified period.

14. The method of claim 13, further comprising:
   uploading a content received regardless of whether the first code of the first application is set, onto the cloud server.

15. The method of claim 10, wherein the first application includes code setting information about each of the first user ID and the second user ID.

16. The method of claim 15, wherein the code setting information includes whether a corresponding code is set, and information about a code value.

17. The method of claim 10, further comprising:
   when executing the first application at a first time, receiving a third user input as to whether a code is set for the first application executed at the first time and setting the first code in the first application based on the third user input.

18. The method of claim 17, wherein, when the third user input is an input for setting a PIN code in an application executed at the first time, receiving a fourth user input for determining a code through the input interface and setting the first code in the first application depending on the fourth user input.

* * * * *